United States Patent
Freedman et al.

(10) Patent No.: US 10,474,645 B2
(45) Date of Patent: Nov. 12, 2019

(54) AUTOMATICALLY RETRYING TRANSACTIONS WITH SPLIT PROCEDURE EXECUTION

(71) Applicant: Microsoft Technology Licensing, LLC, Redmond, WA (US)

(72) Inventors: Craig Steven Freedman, Sammamish, WA (US); Michael James Zwilling, Bellevue, WA (US); Erik Ismert, Shoreline, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 14/188,145

(22) Filed: Feb. 24, 2014

(65) Prior Publication Data

US 2015/0242439 A1 Aug. 27, 2015

(51) Int. Cl.
| | | |
|---|---|---|
| *G06F 17/30* | (2006.01) | |
| *G06F 16/18* | (2019.01) | |
| *G06F 16/23* | (2019.01) | |
| *G06F 9/46* | (2006.01) | |

(52) U.S. Cl.
CPC .......... *G06F 16/1865* (2019.01); *G06F 9/466* (2013.01); *G06F 16/2322* (2019.01)

(58) Field of Classification Search
CPC ......... G06F 17/30227; G06F 17/30353; G06F 9/466; G06F 16/1865; G06F 16/2322
USPC ........................................................ 707/703
See application file for complete search history.

(56) References Cited

U.S. PATENT DOCUMENTS

| | | | |
|---|---|---|---|
| 5,317,731 A | | 5/1994 | Dias et al. |
| 5,369,761 A | * | 11/1994 | Conley ............ G06F 17/30595 |
| 5,625,815 A | * | 4/1997 | Maier ............... G06F 17/30595 |
| 5,812,996 A | | 9/1998 | Rubin et al. |
| 5,870,758 A | * | 2/1999 | Bamford .......... G06F 17/30362 |
| 5,875,334 A | | 2/1999 | Chow et al. |
| 5,966,531 A | | 10/1999 | Skeen et al. |

(Continued)

FOREIGN PATENT DOCUMENTS

CN 103294966 A 9/2013

OTHER PUBLICATIONS

Yu, et al., "DryadLINQ: A System for General-Purpose Distributed Data-Parallel Computing Using a High-Level Language", In Proceedings of the 8th USENIX Conference on Operating Systems Design and Implementation, Dec. 8, 2008, 14 pages.

(Continued)

*Primary Examiner* — Miranda Le
(74) *Attorney, Agent, or Firm* — Workman Nydegger

(57) ABSTRACT

Running a transaction against a database that allows the transaction to be automatically retried when the transaction fails such that certain transaction failures that cause the transaction to be automatically retried are not visible to an entity that receives data as a result of the execution of the transaction. A first set of statements of a transaction is identified by identifying statements that will cause a change in the database state. A second set of statements is identified, that result in data being generated to be sent to the entity. The method further includes executing the first set of statements to change the database. The method further includes running the second set of statements separately from the first set of statements to generate data to be sent to the entity.

19 Claims, 4 Drawing Sheets

(56) References Cited

U.S. PATENT DOCUMENTS

| | | | |
|---|---|---|---|
| 6,009,425 A | 12/1999 | Mohan | |
| 6,026,379 A * | 2/2000 | Haller | G06Q 20/00 |
| | | | 705/34 |
| 6,122,644 A | 9/2000 | Graefe et al. | |
| 6,195,677 B1 | 2/2001 | Utsumi | |
| 6,237,001 B1 * | 5/2001 | Bamford | G06F 9/466 |
| 6,442,552 B1 * | 8/2002 | Frolund | G06F 17/30861 |
| | | | 707/613 |
| 6,496,976 B1 * | 12/2002 | Smith | G06F 8/48 |
| | | | 717/145 |
| 6,665,701 B1 | 12/2003 | Combs et al. | |
| 6,772,363 B2 * | 8/2004 | Pedone | H04L 1/22 |
| | | | 707/999.201 |
| 6,940,870 B2 | 9/2005 | Hamlin | |
| 6,971,096 B1 | 11/2005 | Ankireddipally et al. | |
| 6,990,513 B2 | 1/2006 | Belfiore et al. | |
| 7,089,244 B2 * | 8/2006 | Shi | G06F 17/30351 |
| 7,093,231 B2 | 8/2006 | Nuss | |
| 7,103,597 B2 * | 9/2006 | McGoveran | G06F 11/1474 |
| 7,111,023 B2 * | 9/2006 | Norcott | G06F 17/30368 |
| 7,120,703 B2 | 10/2006 | Li et al. | |
| 7,305,386 B2 | 12/2007 | Hinshaw et al. | |
| 7,496,726 B1 * | 2/2009 | Nussbaum | G06F 9/466 |
| | | | 711/119 |
| 7,505,975 B2 * | 3/2009 | Luo | G06F 9/466 |
| 7,552,439 B2 * | 6/2009 | Fox | G05B 19/0426 |
| | | | 700/18 |
| 7,675,871 B2 | 3/2010 | Garney et al. | |
| 7,694,284 B2 | 4/2010 | Berg et al. | |
| 7,707,195 B2 | 4/2010 | Nettleton et al. | |
| 7,711,730 B2 * | 5/2010 | Bernal | G06F 17/30595 |
| | | | 707/718 |
| 7,739,223 B2 | 6/2010 | Vaschillo et al. | |
| 7,756,882 B2 | 7/2010 | Aharoni et al. | |
| 7,774,780 B2 * | 8/2010 | Chow | G06F 11/1479 |
| | | | 718/101 |
| 7,805,713 B2 | 9/2010 | Patel | |
| 7,984,043 B1 | 7/2011 | Waas | |
| 8,166,009 B2 * | 4/2012 | Dunn | G06F 17/30377 |
| | | | 707/704 |
| 8,402,318 B2 * | 3/2013 | Nieh | G06F 11/3419 |
| | | | 714/15 |
| 8,464,261 B2 * | 6/2013 | Moir | 711/147 |
| 8,473,953 B2 * | 6/2013 | Bourbonnais | G06F 11/1474 |
| | | | 707/703 |
| 8,527,501 B2 * | 9/2013 | Horii | G06F 17/30448 |
| | | | 707/713 |
| 8,572,051 B1 * | 10/2013 | Chen | G06F 17/30445 |
| | | | 707/687 |
| 8,782,647 B2 * | 7/2014 | Kajita | G06F 9/45512 |
| | | | 709/201 |
| 8,983,985 B2 * | 3/2015 | Chen | G06F 17/30315 |
| | | | 707/754 |
| 9,063,969 B2 * | 6/2015 | Lee | G06F 17/30377 |
| 9,195,712 B2 | 11/2015 | Freedman et al. | |
| 9,251,194 B2 * | 2/2016 | Neerincx | G06F 17/30348 |
| 9,336,258 B2 * | 5/2016 | Bhattacharjee | G06F 17/30362 |
| 9,436,471 B2 * | 9/2016 | Malyugin | G06F 11/3414 |
| 2002/0100027 A1 | 7/2002 | Binding et al. | |
| 2002/0194503 A1 | 12/2002 | Faith et al. | |
| 2003/0140308 A1 | 7/2003 | Murthy et al. | |
| 2004/0073913 A1 | 4/2004 | Fairweather et al. | |
| 2004/0083465 A1 | 4/2004 | Zhang et al. | |
| 2004/0111698 A1 | 6/2004 | Soong et al. | |
| 2004/0205562 A1 | 10/2004 | Rozek et al. | |
| 2004/0249838 A1 | 12/2004 | Hinshaw | |
| 2005/0198041 A1 * | 9/2005 | Lewandowski | G06F 17/30867 |
| 2005/0273655 A1 | 12/2005 | Chow et al. | |
| 2006/0004696 A1 | 1/2006 | Day et al. | |
| 2006/0036574 A1 | 2/2006 | Schweigkoffer et al. | |
| 2006/0224563 A1 | 10/2006 | Hanson et al. | |
| 2006/0235853 A1 * | 10/2006 | Luo | G06F 9/466 |
| 2008/0147698 A1 | 6/2008 | Gustafsson et al. | |
| 2009/0012980 A1 | 1/2009 | Stefani et al. | |
| 2009/0172641 A1 | 7/2009 | Wong | |
| 2009/0265249 A1 | 10/2009 | Bishop et al. | |
| 2009/0271763 A1 | 10/2009 | Varma et al. | |
| 2010/0036831 A1 * | 2/2010 | Vemuri | G06F 17/30516 |
| | | | 707/707 |
| 2010/0235860 A1 | 9/2010 | White et al. | |
| 2010/0333093 A1 * | 12/2010 | Nussbaum | G06F 9/30087 |
| | | | 718/101 |
| 2011/0029508 A1 | 2/2011 | Al-Omari et al. | |
| 2011/0060622 A1 | 3/2011 | Piersol et al. | |
| 2011/0131199 A1 | 6/2011 | Simon et al. | |
| 2011/0153566 A1 | 6/2011 | Larson et al. | |
| 2011/0238851 A1 | 9/2011 | Zhang et al. | |
| 2011/0252000 A1 | 10/2011 | Diaconu et al. | |
| 2011/0320409 A1 * | 12/2011 | Iyengar | G06F 17/30377 |
| | | | 707/674 |
| 2012/0109903 A1 | 5/2012 | Freedman et al. | |
| 2012/0203762 A1 | 8/2012 | Kakarlamudi et al. | |
| 2012/0209762 A1 * | 8/2012 | Metaireau | G06Q 20/10 |
| | | | 705/39 |
| 2012/0226945 A1 * | 9/2012 | Johnson | G06F 9/466 |
| | | | 714/37 |
| 2013/0006964 A1 | 1/2013 | Hammerschmidt et al. | |
| 2013/0006993 A1 * | 1/2013 | Kobayashi | G06F 17/30371 |
| | | | 707/737 |
| 2013/0191817 A1 | 7/2013 | Vorbach | |
| 2014/0244597 A1 | 8/2014 | Freedman et al. | |
| 2014/0280030 A1 | 9/2014 | Freedman et al. | |
| 2014/0337393 A1 * | 11/2014 | Burchall | G06F 17/30377 |
| | | | 707/826 |
| 2015/0006466 A1 * | 1/2015 | Tonder | G06F 17/30359 |
| | | | 707/602 |
| 2016/0048553 A1 | 2/2016 | Freedman et al. | |
| 2016/0078084 A1 | 3/2016 | Freedman et al. | |
| 2017/0161296 A1 * | 6/2017 | Ritter | G06F 17/30174 |

OTHER PUBLICATIONS

Le-Phuoc, et al., "A Native and Adaptive Approach for Unified Processing of Linked Streams and Linked Data", In Proceedings of 1th International Semantic Web Conference, Oct. 23, 2011, 16 pages.

Toman, et al., "Query Processing in Embedded Control Programs", In Proceedings of the VLDB International Workshop on Databases in Telecommunications II, Sep. 10, 2001, 20 pages.

Moore, Sheila, "Tuning PL/SQL Applications for Performance", Published Aug. 2009, Available at <<http://docs.oracle.com/cd/B28359_01/appdev.111/b28370/tuning.htm>>.

Neumann, Thomas, "Efficiently Compiling Efficient Query Plans for Modern Hardware", In Proceedings of the VLDB Endowment, vol. 4, Issue 9, Aug. 29, 2011, 12 pages.

Adhikari, et al., "D-Stampede: Distributed Programming System for Ubiquitous Computing", Jul. 2002, 8 pages.

Chiang, C., "High-Level Heterogeneous Distributed Parallel Programming", In Proceedings of the 2001 International Symposium on Information and Communication Technologies, Jun. 2004, 6 pages.

Commins, M., "JXTA, In Support of the Migration of users Across Smart Spaces", Sep. 2002, 100 pages.

Karimi, K., et al., "Transparent Distributed Programming under Linux", May 14-17, 7 pages.

Boukottaya, et al., "Automating XML documents transformations: a conceptual modelling based approach", Jan. 2004, pp. 81-90. Available at <<http://delivery.acm.org/10.1145/980000/976307/p81-boukottaya.pdf>>.

Amer-Yahia, et al., "A comprehensive solution to the XML-to-relational mapping problem", Nov. 2004, pp. 31-38. Available at <<http://delivery.acm.org/10.1145/1040000/1031461/p31-amer-yahia.pdf>>.

He, et al., "Statistical schema matching across web query interfaces", Jun. 2003, pp. 217-228. Available at <<http://delivery.acm.org/10.1145/880000/872784/p217-he.pdf>>.

International Search Report & Written Opinion Issued in PCT Patent Application No. PCT/US2015/016723, dated May 4, 2015, 10 Pages.

(56) References Cited

OTHER PUBLICATIONS

U.S. Appl. No. 14/272,074, dated Mar. 30, 2015, Notice of Allowance.
U.S. Appl. No. 13/797,035, dated Apr. 6, 2015, Office Action.
U.S. Appl. No. 11/613,046, dated Nov. 29, 2010, Office Action.
U.S. Appl. No. 11/613,046, dated Jan. 28, 2011, Notice of Allowance.
Notice of Allowance dated Jul. 17, 2015 in U.S. Appl. No. 13/797,035.
First Office Action Received in China Patent Application No. 201110358461.2, dated Dec. 19, 2013, 12 Pages.
Second Office Action Received in China Patent Application No. 201110358461.2, dated Jul. 16, 2014, 6 Pages.
Zhao, et al., "Integrating Fault Tolerant CORBA and the CORBA Object Transaction Service", Published on: Sep. 13, 2006, Available at: http://academic.csuohio.edu/zhao_w/papers/icssea01.pdf.
U.S. Appl. No. 13/797,035, Ismert, et al., "Method of Converting Query Plans to Native Code", filed Mar. 12, 2013.
Hellerstein, "Architecture of a Database System", Foundations and Trends in Databases, vol. 1, No. 2, Sep. 2007, pp. 141-259, http://db.cs.berkeley.edu/papersfntdb07-architecture.pdf.
Oracle, Oracle Database Concepts, 13 Data Concurrency and Consistency, http://download.oracle.com/docs/cd/B19306_01/server.102/b14220/consist.htm.
Todd, "IBPhoenix Development: InterBase: What Sets It Apart", http://web.archive.org/web/20030408062029/http:/www.ibphoenix.com/mainnfs?a=ibphoneix&page=ibp_bill_todd_mga.
Author Unknown, PostgreSQL 9.0.1 Documentation Chapter 13. Concurrency Control Transaction Isolation, http://www.postgresql.org/docs/9.0/static/transaction-iso.html.
Blakeley, et al., "Distributed/Heterogeneous Query Processing in MicrosoftSQL Server", http://ieeexplore.ieee.org/Xplore/login.jsp?url=http%3A%2F%2Fieeexplore.ieee.org%2Fstamp.jsp%3Farnumber%3D01410211&authDecision=-201.
Author Unknown, Oracle® Rdb7 forOpen VMS, http://download.oracle.com/otn_hosted_doc/rdb/pdf/rdbrn_7062.pdf.
U.S. Appl. No. 12/915,994, dated Jun. 26, 2012, Office Action.
U.S. Appl. No. 12/915,994, dated Jan. 23, 2013, Office Action.
U.S. Appl. No. 12/915,994, dated Sep. 24, 2013, Office Action.
U.S. Appl. No. 12/915,994, dated Mar. 7, 2014, Notice of Allowance.
Notice of Allowance dated Oct. 24, 2016 in U.S. Appl. No. 14/829,325.
Office Action dated Nov. 3, 2016 in U.S. Appl. No. 14/949,302.
Eumann, Thomas et al., "Compiling Database Queries into Machine Code", IEEE Data Eng. Bull. 31.1 (2014): 3-11.
Notice of Allowance dated Feb. 23, 2017 in U.S. Appl. No. 14/949,302.
Office Action dated Apr. 27, 2016 in U.S. Appl. No. 14/949,302.
Office Action dated Jun. 17, 2016 in U.S. Appl. No. 14/829,325.
Notice of Allowance dated Jun. 21, 2017 in U.S. Appl. No. 14/949,302.
"First Office Action Issued in Chinese Patent Application No. 201580010207.X", dated Nov. 15, 2018, 11 Pages.

\* cited by examiner

AUTOMATICALLY RETRYING TRANSACTIONS WITH SPLIT PROCEDURE EXECUTION

BACKGROUND

Background and Relevant Art

Computers and computing systems have affected nearly every aspect of modern living. Computers are generally involved in work, recreation, healthcare, transportation, entertainment, household management, etc.

In computing, a transaction is a set of statements defining functions that must all succeed or all fail atomically. For example, consider a simple financial transaction. In the simple example illustrated, a debit is made to one account while a credit is made to another account. Transactionally, neither the debit nor credit can occur without the other without causing data inconsistencies. Thus, the transaction may include statements causing the debit to be performed and statements causing a credit to be performed. If both the credit and debit are performed, then the effect of the debit and the credit are made durable, sometimes referred to as committing the transaction. If either the debit or credit fails, the transaction is aborted and all intermediate functions are rolled back to a state that existed before the transaction was begun.

Transactions typically fall into two categories, namely, pessimistic and optimistic. In pessimistic transactions, locks are taken on data resources by entities thus preventing other entities from writing to and/or reading from the data resources. This allows operations to be performed without interference from other entities. In optimistic transactions, it is assumed (sometimes incorrectly) that no other entities will interfere with operations and thus no locks are taken. Validation is performed in a validation" phase at the conclusion of performing the substantive data processing operations of a transaction to ensure that no other entities have performed operations on the same resources. If there are conflicting operations, one or several transactions can be rolled back and retried.

Transactions running against a database can fail to execute due to a variety of transient errors. For example, such errors may include deadlocks or, in the case of an optimistic concurrency control system such as On-Line Transaction Processing (OLTP) in-memory technology available in SQL Server® available from Microsoft Corporation of Redmond, Wash., validation failures. Applications often include logic to detect such failures and retry transactions. Retry logic can be complex and costly to implement on a client communicating with a server where a transaction has failed. A client library that implements automatic retries will still incur overhead in the form of extra communication round trips with the server to effectuate the retry.

A common request is for the server to handle transient failures and automatically retry failed transactions without client interaction. Unfortunately, automatic (transparent to the client) retries are not always possible if the server has already returned any data to the application or client.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for running a transaction against a database that allows the transaction to be automatically retried when the transaction fails such that certain transaction failures that cause the transaction to be automatically retried are not visible to an entity that receives data as a result of the execution of the transaction. The method includes identifying a first set of statements of a transaction by identifying statements, the execution of which, will cause a change in the database state. The method further includes identifying a second set of statements of the transaction by identifying statements, the execution of which, result in data being generated to be sent to the entity. The method further includes executing the first set of statements to change the database state while performing operations to specifically exclude execution of at least a portion of the statements in the second set of statements. The method further includes running the second set of statements separately from the first set of statements to generate data to be sent to the entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
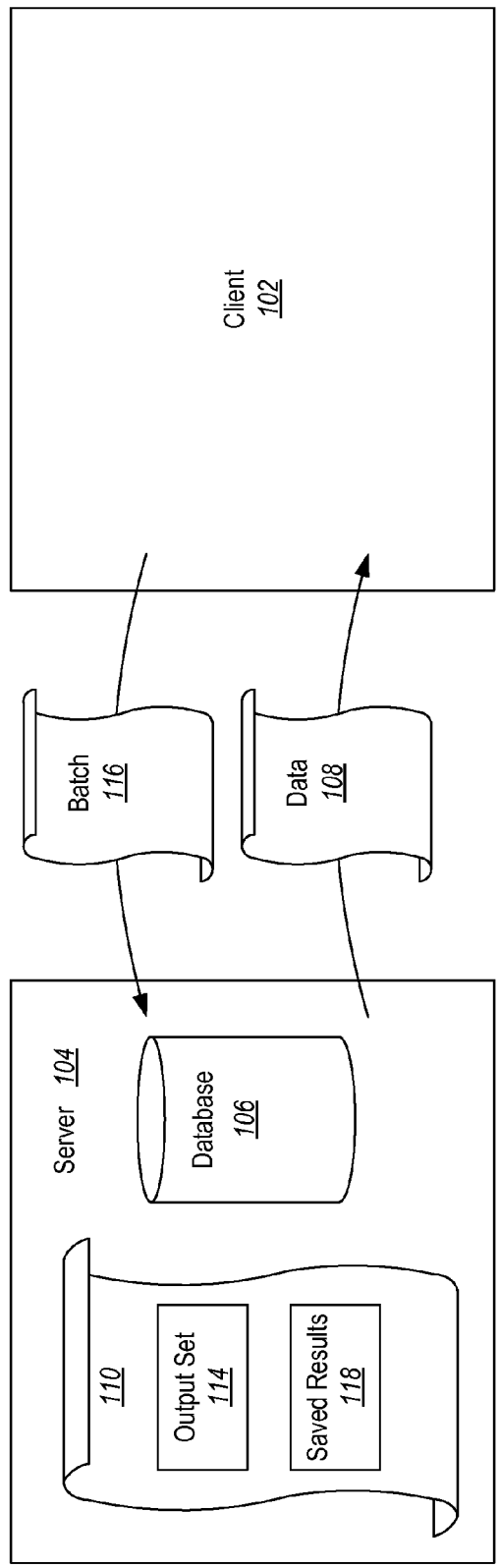
FIG. 1 illustrates a client and a server where the server has functionality for performing automatic retries.

Referring now to FIG. 1, embodiments herein may implement a mechanism to separate execution of a transaction (or other processing) into at least two different phases. Generally, in the first phase (a modify phase), the transaction executes any operations, by executing statements, that do not interact with the client 102 and that can be automatically retried in the event of a failure without the client 102 needing to be made aware of any failures. In the second phase (an output phase), the transaction executes any operations, by executing statements that return data to the client 102. For example, a server 104 can perform operation to update data in a database 106, but delay generating data 108 that is eventually sent to the client 102 until a later time (or generate and discard data 108 and later regenerate data 108). This split execution increases the chances that any failures can be handled internally by the server 104 and reduces the risk that a failure must be exposed to the client 102. Statements, as used herein may occasionally include functionality where if a given statement is executed, one or more operations that do not interact with a client and one or more operations that do interact with a client may be performed. In some embodiments, such statements may be subdivided into sub-statements. Thus, when statements are referred to herein, it should be appreciated that such statements could actually be created from a logically divided higher level statement.

There are two methods described herein for splitting execution into the two phases as described below. Note that hybrid methods can also be implemented that combine elements of the two described methods. In the first method, referred to herein as an output plan method, during the modify phase, embodiments build an output plan that captures whatever information is needed to execute the output phase. This plan might include statements to execute, timestamps, parameters, the results of non-deterministic functions, etc. This plan might also include entire results sets (e.g., if the result sets are small and/or if embodiments have to execute the statements to complete the modify phase and do not wish to rerun them again). During the output phase, embodiments "execute" the output plan. The nature of the output plan means that embodiments do not have any decisions to make in the output phase, but rather embodiments just do as the output plan directs.

In the second method, referred to herein as the rerun method, embodiments run the transaction twice. During the modify phase, embodiments simply skip any output statements (except for those that might affect the results of the modify phase—e.g., those that affect flow control around modify statements) and run just the modify statements. Embodiments do not create an output plan or generally save any results. If there are non-deterministic functions involved, embodiments might have to save at least some parameters or results. This is one example where a hybrid approach may be used. During the output phase, embodiments run the transaction again including repeating any "procedural logic" or flow control. However, on the rerun embodiments run just the output statements and skip the modify statements, except for those that might affect the results of the output phase. Such modify statements may include, for example, flow control around output statements. If embodiments repeat a modify statement, embodiments do not actually modify anything the second time around.

Figure 2:
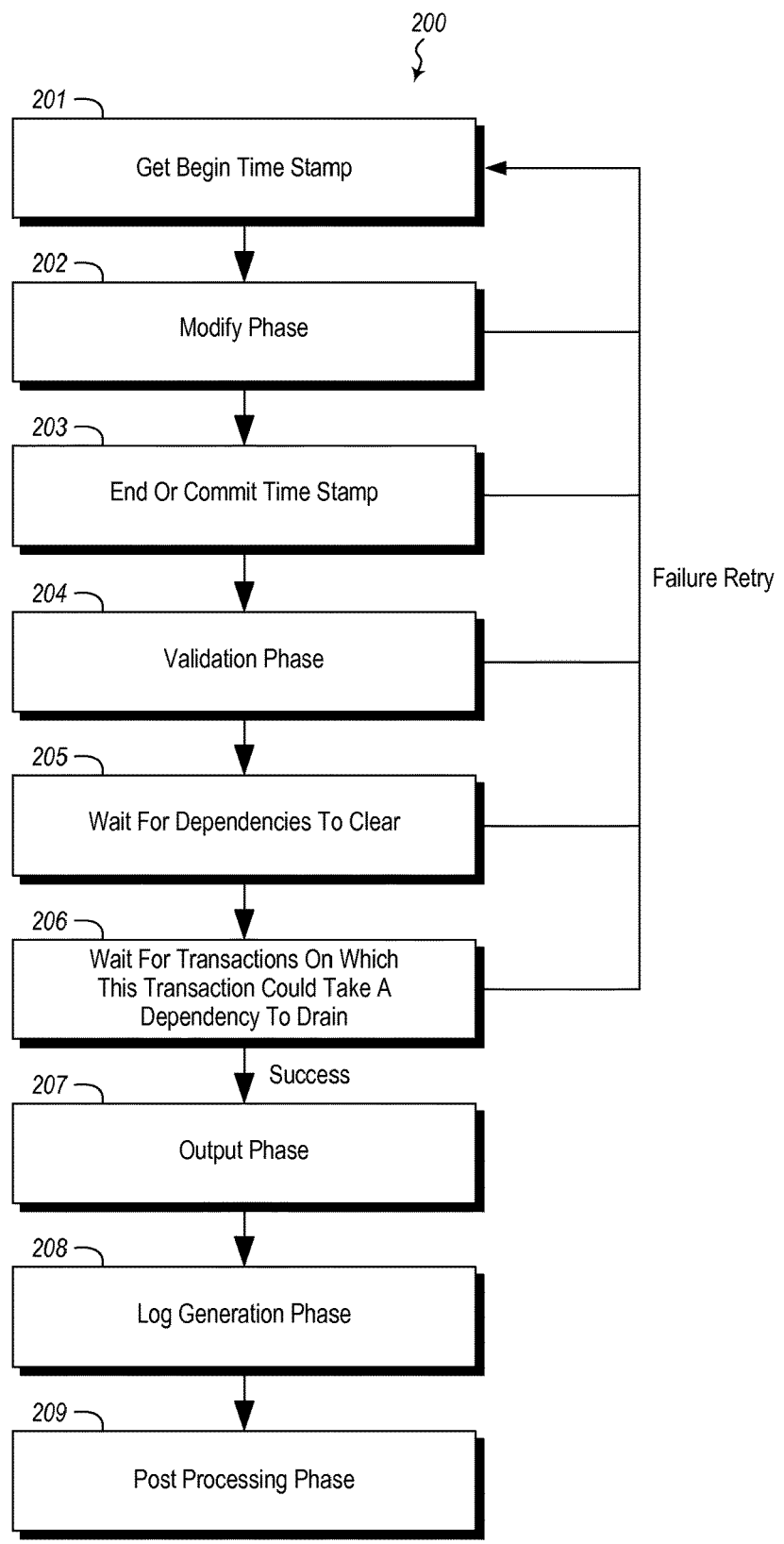
FIG. 2 illustrates various phases that can be performed for database updates and for returning data to a client.

While two phases (i.e. the modify phase and output phase) are specifically called out, some embodiments implement a nine phase process as illustrated in FIG. 2. FIG. 2 illustrates a process 200 with phases for executing a trans action.

FIG. 2 illustrates a "Get Begin Timestamp" phase 201. In this phase 201 a timestamp is obtained at the server 104 that identifies a relative time when a transaction associated with the process 200 is begun. This timestamp is used to determine which data to read. The timestamp can also be used in comparisons to other transactions performed at the server 104 to determine if dependencies from other transactions are possible, if the transaction might be dependent on another transaction or if conflicting transactions have taken place.

FIG. 2 illustrates a "Modify Phase" 202. In this phase 202, data that can be modified in the database 106 as a result of transaction operations are modified at the server 104, and the database 106 is updated. Note that, as will be illustrated later herein with reference to FIG. 3, database modifications can be performed in a multi-version fashion such that operations can be rolled back should a transaction abort. Transient failures (e.g. write-write conflicts) can occur during the modify phase, which could result in a retry situation that would be transparent to the client 102.

FIG. 2 illustrates an "End or Commit Timestamp" phase 203. In this phase 203, after the database 106 has been updated, a timestamp is created indicating when a transaction associated with the process 200 completed. This timestamp can be used as a comparison operand with timestamps from other transactions to identify transaction conflicts, which transaction wins in a conflict situation, which data is valid in a transaction conflict situation, if the transaction can be dependent on another transaction, if another transaction can be dependent on the transaction, etc. Note that the end timestamp can actually be generated before several of the other phases in the process 200. In particular, the "Output" phase 207 may actually be quite resource and time intensive such that if the phase 203 was performed after the phase 207, this would significantly increase the total time between the begin timestamp of phase 201 and the end timestamp of phase 203. This, in turn, would increase the time for and chances of transaction conflicts in an optimistic transaction system. Thus, by performing the "Output" phase 207 after the "End or Commit Timestamp" phase 203, the likelihood of transaction conflicts and failures can be significantly reduced.

FIG. 2 further illustrates a "Validation" phase 204. In the "Validation" phase 204, comparisons are made to determine in an optimistic transaction system if conflicts between transactions have occurred and if one or more transactions should be rolled back. The main errors that embodiments would want to detect and support for auto-retry are validation failures, commit dependencies, and write-write conflicts. Validation failures are any conflicts between the validating transaction and another transaction such that the validating transaction cannot achieve the isolation level (e.g. repeatable read or serializable) at which it is intended to execute. Validation failures and commit dependencies tend to self-correct on retry since the conflicting transaction must already be in validation and the retrying transaction will acquire a new begin timestamp that is greater than the conflicting transaction's end timestamp. Write-write conflicts are more problematic since they can involve two active transactions and may persist on retry if the transaction that has successfully deleted the row in question is long running. Thus, for write-write conflicts some embodiments may implement a delay for retries until the conflicting transaction completes. Additional details are illustrated below.

FIG. 2 further illustrates a "Wait for Dependencies to Clear" phase 205 and a "Wait For Transactions On Which This Transaction Could Take a Dependency to Drain" phase 206. While the phases 205 and 206 are shown sequentially, it should be appreciated that the order of these two phases could be changed, or that actions in either of these phases could be performed together. Essentially, these two phases cause the process 200 to wait for other transactions which the present transaction could have a dependency on to clear or to wait for other transactions which could have a dependency on the present transaction to clear. For example, once a transaction Tx1 enters validation, it is presumed that it will eventually commit. Thus, rows inserted by Tx1 should be visible to another transaction Tx2 whose begin timestamp is greater than the Tx1's end timestamp. However, since the Tx1 could still fail validation, Tx2 takes a dependency on Tx1 before reading any row inserted by Tx1. If Tx1 subsequently fails validation and aborts, Tx2 must also abort. Using this example, Tx2 would implement phase 205 by waiting for Tx1 to commit. Phase 206 is a little more subtle. Suppose that Tx2 has not already taken a dependency on Tx1 when Tx2 gets an end timestamp and successfully completes validation. At this point, Tx2 should not fail. However, Tx2 can be forced to take a dependency if during its output phase it tries to read a row inserted by Tx1. To avoid this case, Tx2 implements phase 206 by waiting for any validating transaction such as Tx1 that has an end timestamp that is less than Tx2's begin timestamp. Once all such transactions complete Tx1 can proceed. In some embodiments, a system may be implemented where Tx2 can take a dependency on Tx1 even before Tx1 enters validation.

The process 200 further illustrates an "Output" phase 207. This phase 207 performs operations to generate output data 108 that will be returned to a client 102. In some embodiments, all or some of the operations intended to generate data 108 that will be returned to the client 102 are delayed until they need to be executed to generate the data 108. However, sometimes some of the operations may need to be performed earlier, such as at the "Modify" phase 202, to generate data needed to update the database 106 at the server 104 or to determine which statements to run in the "Modify" phase 202. In some such cases, the operations can be performed and any data generated will be discarded so as to not require caching excessive amounts of data. The operations will be rerun at the "Output" phase 207 to generate the needed data for sending the data 108 to the client 102. However, in some embodiments, if the data is sufficiently small, difficult to generate, or non-deterministic, some such data can be cached at the "Modify" phase 202 and sent at the "Output" phase 207 as part of the data 108 sent to the client 102.

In particular, with respect to non-deterministic results, two basic options are now illustrated. For the first option, embodiments save the entire result and return the saved result during the "Output" phase 207. For example, consider the following statement:

"SELECT NEWID( ) FROM . . . ".

NEWID( ) returns a new GUID (globally unique identifier) each time it is called. This query could return many GUIDs. Thus, in this case, running the query and saving the result including all of the new GUIDs might be a reasonable approach.

Alternatively, embodiments may save just the non-deterministic parameters or function outputs that are required to rerun the statement in a deterministic way. Consider the following example:

"SELECT . . . FROM Sales WHERE Date= GETDATE( )".

GETDATE( ) is non-deterministic. It might return a different answer if is is run twice. But, saving just the output of GETDATE( ) is likely going to require less memory than saving all of the sales data from the query.

As will be illustrated below, in some embodiments, an output plan 110 can be generated. The majority of the output plan 110 can be generated before the "Modify" phase 202 (or as part of the "Modify" phase 202) or the "Output" phase is begun. The output plan 110 can include a set 114 of operations to be performed at the "Output" phase 207. Thus, various statements can be run as part of the "Modify" phase 202, while statements to be run at the "Output" phase 207 are stored in the set 114.

In some embodiments, some statements configured to generate output (such as those in the set 114 when using the output plan method or output statements identified in the rerun method) may need to be executed to determine what statements to run during the "Modify" phase 202 or may need to be run because they produce a non-deterministic result. The results from the statement can either be discarded or saved, depending on the nature of the result and/or details of the implementation. For example, if the data generated is sufficiently small, or the data is non-deterministic the data can be added to a saved result set 118 that can be saved in the output plan 110 when using the output plan method. If the rerun method is being used, the result set can be saved to other appropriate storage.

Embodiments can choose not to rerun output statements if a result has already been generated and saved in the saved results. Some embodiments will not include a saved result, but rather will generate all results by running output statements (e.g. statements in the output set 114 or statements otherwise identified as generating output to send to a client 102). Generally data will be discarded after the "Modify" phase 202 so as to not have large amounts of data cached.

FIG. 2 further illustrates a "Log Generation" phase 208. The "Log Generation" phase 208 has functionality similar to log generation in other transaction systems. Some portions of the "Log Generation" phase 208 can be performed concurrently with other phases in the process 200.

FIG. 2 illustrates a "Post Processing" phase 209. This phase is performed at the conclusion of the processing 200 to perform various clean-up operations on the database 106 and/or at the server 104.

Embodiments can be applied to virtually any scenario where it might be desirable to delay returning results to a client. For example, some systems block execution to avoid sending results to a client when those results depend on another transaction first committing. Implementing functionality described herein, such blocking becomes unnecessary.

Further, embodiments can be used to reduce the window during which a transaction executing using optimistic concurrency control is vulnerable to conflicts and thus, reduce the transaction failure rate. For example, embodiments may reduce the time elapsed between when a transaction begins (e.g. as defined by a begin timestamp) and when it ends or when it acquires its end timestamp, thus reducing the amount of time in which two different transactions in an optimistic based system might have conflicting accesses. Notably, embodiments may alternatively be used in a pessimistic system. For example, embodiments could be used to reduce the window during which a transaction executing in a conventional lock based database system (such as SQL Server®) must hold its locks thereby increasing transaction concurrency and reducing the risk of deadlocks.

Thus, embodiments may automatically split a transaction for a database into at least two phases. One phase is for performing updates to the database state, as illustrated by the "Modify" phase 202. The second phase (illustrated by the "Output" phase 207) for generating result sets, as illustrated by the data 108, to send to a client 102. This can facilitate enabling automatic transaction retries, eliminating the need for blocking due to transaction dependencies, and/or reducing the risk of transactions failing due to conflicts.

Embodiments can be applied to natively compiled procedures, such as those implemented in the OLTP technology implemented in SQL Server® or to conventional interpreter based transaction execution (such as that used by all other SQL Server® batches and procedures—including ad hoc batches). There are a number of different alternatives and options for achieving this split as descried below.

Transactions can be automatically and transparently retried vis-à-vis the client 102 if the server 104 has not sent any results to the client 102 prior to the transaction failing. If the server 104 has returned any results to the client 102 before the transaction failure, the client 102 typically must be notified of the failure so that it can discard the now invalid results and generally be involved in the transaction retry logic. Thus if any failure occurs between phases 202 and 206 inclusive, then the transaction execution jumps back to step 201 and begins again.

Notably, while the phases are shown in a particular order, it should be appreciated that embodiments are not limited to this order. For example, phases 205 and 206 can execute in either order or even concurrently. In some systems, other orderings are possible and may be preferable.

Some embodiments may include mechanisms to delay generating result sets, i.e. data 108, (and, thus, avoid the need to buffer result sets) while executing the remainder of the transaction and ensuring that the transaction can commit successfully. Alternatively, some results may be generated and stored, but not sent to the client 102. This may be especially useful for small intermediate results. If the transaction cannot commit for any reason, the server 104 can automatically abort the current transaction and retry it without the client 102 being aware of the abort and retry. After the server 104 has determined that the transaction can commit successfully (perhaps after one or more retry attempts), it can then generate all result sets, i.e., data 108, and send them to the client 102. The client 102 does not need to be aware of the failures at all.

Referring now to FIG. 1, the client 102 submits an entire transaction to the server 104 in a single "batch" 116 such that it expects no intermediate results. If the client 102 were to submit only part of the transaction and then wait for intermediate results, that particular transaction cannot be retried automatically without notifying the client if intermediate results have already been sent.

Figure 3:
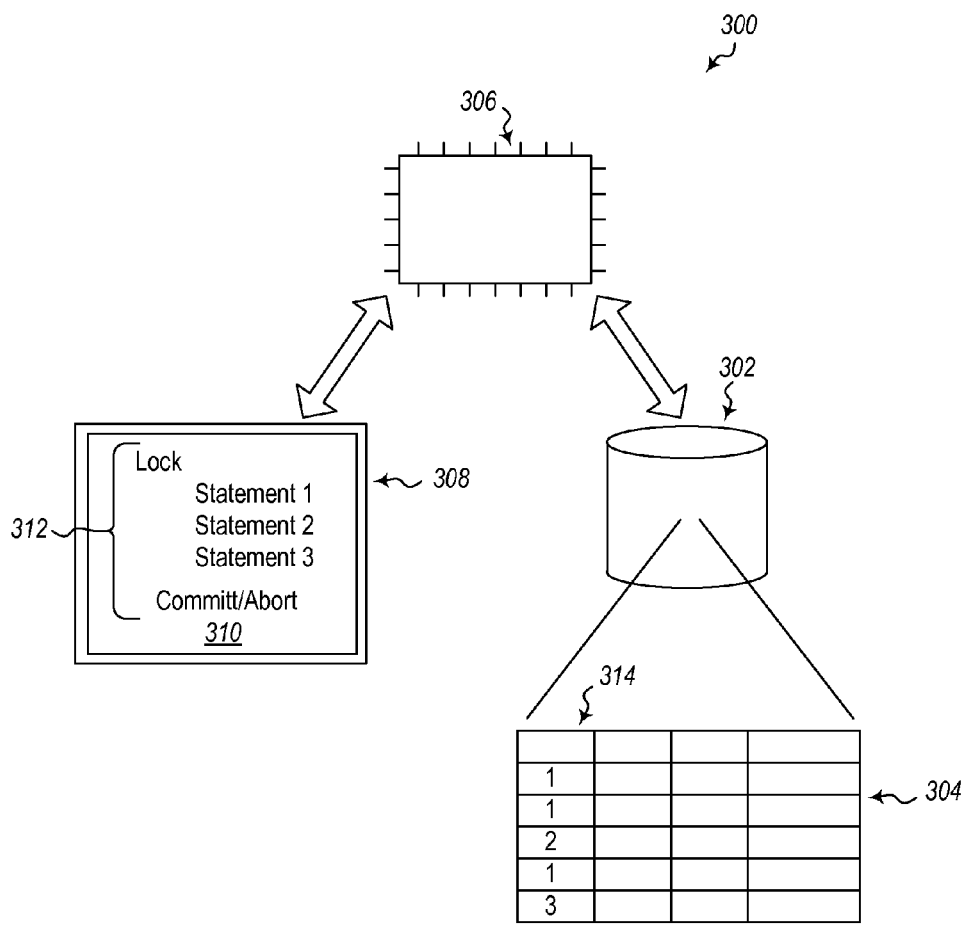
FIG. 3 illustrates an example of a multi-versioned database.

Some embodiments can be implemented using a multi-version based storage engine in which every update (including intra-transaction updates) are versioned. The OLTP technology implemented in SQL Server® implements such an engine. Referring now to FIG. 3, an example of a multi-versioned database is illustrated.

In the example illustrated in FIG. 3, a transaction 312 includes three statements within a lock. The lock illustrated is not required, but may be used for some embodiments. The statements in the transaction 312 may be used to operate on records in the database table 304. Some embodiments described herein may augment version stores with per-statement version numbers to differentiate records created by the current statement from records created by earlier statements. In particular, some embodiments may assign an identifier to each statement in the transaction 312. When a statement performs certain functions on records in the database table 304, the identifier assigned to the statement performing the functions may be associated with the record on which the function was performed.

For example, in some embodiments, extra information is stored with each new record created in a database table 304 and each existing record in a database table deleted by a statement within a transaction 312. In the example illustrated in FIG. 3, a statement identifier column 314 is included in the database table 304. The statement identifier column 314 includes an identifier identifying a statement from the transaction 312 that created a corresponding row. In the example illustrated, the identifier 1 corresponds to Statement 1, the identifier 2 corresponds to Statement 2, and the identifier 3 corresponds to Statement 3. While in the illustrated example, the identifier is shown as being include in a column element of a record, it should be appreciated that other methods of storing and correlating the identifier may be used alternatively or additionally. For example, in some embodiments, the identifier may be stored in a record header. Alternatively or additionally, embodiments may be implemented where records are correlated to statements by creating a statement table for a statement in which records created by the statement are stored in the statement table. Various examples will be illustrated further herein.

Storing extra information allows a determination to be made when reading a set of records as to which records were created by the current statement and which ones already existed prior to the start of the statement execution. Embodiments may utilize multi-versioning by relying on deletes and updates not immediately deleting or destroying old versions of records, but rather creating and inserting a new version to supersede the old version. Thus, after an update both the old and new versions of the updated record exist in the database table 304 at the same time and a statement that creates the new version can still read the old version, but may be prevented from reading the new version that the statement itself created.

In particular, this extra information can be used to ensure that a data modification statement sees only the state of the database as it existed before the statement started execution and to prevent a statement from seeing its own changes. Some embodiments may cause these conditions to be true for all data modification statements including insert, update (modify), and delete statements.

Embodiments can be applied to multi-version database systems including SQL® Server's snapshot isolation. Embodiments can be applied to disk-based and/or main-memory systems and to systems that use either pessimistic (i.e., lock-based) or optimistic (i.e., validation-based) concurrency control schemes.

There are various implementation options for correlating data store operation statements with version of data store records. A number of these will be discussed below. For example one embodiment may assign each statement within a transaction 312 a unique version number. In some embodiments, these numbers can be generated as monotonically increasing integers. The example illustrated in FIG. 3 illustrates just such an example. Alternatively or additionally, a timestamp assigned to statement may be used, such as for example, a timestamp indication when the statement first performed some function on a record. While these example embodiments have been illustrated, it should be appreciated that any one of a number of different number schemes may be used. For example, in some embodiments, any scheme that generates unique numbers for statements, either globally or within a transaction, can be used.

As noted, embodiments, may be implemented where a version number for a statement is stored in each record created by that statement. Embodiments may be implemented where when reading, that statement is only allowed to see records that do NOT contain the current version number, i.e. the version number corresponding to the statement. For example, in FIG. 3, Statement 3 of the transaction 312 can read records with identifiers 1 and 2 in the statement identifier column 314, but cannot read records with the identifier 3 in the statement identifier column.

If each transaction also has its own transaction identifier (which is common in multi-version systems), and if the transaction identifier is stored with any record created by the transaction, statement version numbers can be reused by statements in different transactions. Thus, for example, a 4-byte version number would allow up to $2^{32}$ (about 4 billion) statements per transaction and should be sufficient to allow any reasonable transaction to complete. In alternative embodiments version numbers can nonetheless be transaction context specific even when transaction identifiers are not stored with any record created by the transaction. In these embodiments, part of the transaction committing process may include clearing version numbers from records.

Alternatively, an implementation could assign transaction and statement identifiers from a single unique identifier space. This scheme would potentially allow for the use of larger identifiers.

In the examples illustrated above, statement identifiers were stored with records. However, alternative embodiments may be implemented where a transaction stores a list of records created or deleted by the current statement. In some embodiments, this list may be stored in a data structure such as a hash table that makes searches efficient. A single list could be used for records that are created or deleted. However, both inserted and deleted records are added to the list. However, presence in the list has different effects depending on whether a record was inserted or deleted. For example, if the record is identified in the list as a result of being inserted, then the statement is prevented from reading the record. If the record is identified in the list as a result of being deleted, then the statement would still be allowed to see the record. An indicator can be included in the list to indicate if the record is in the list as a result of being inserted or deleted. Alternatively or additionally, the record itself may have some sort of indicator to indicate if the record is a deleted record. Alternatively or additionally, presence in the list simply reverses the default visibility of a record. This list can be discarded after each statement completes. When reading, if a statement encounters a record created by the current transaction, it checks the list of records associated with the current transaction to determine if the record was created by the current statement and should be skipped or whether it previously existed and should be visible or in the case of a deleted statement if the record was created by the current statement and should be visible or whether it previously was deleted and should be skipped.

Storing the statement version number with each record is particularly suitable to main memory systems where the cost of returning to a record to reset the version number is limited to a memory write. Disk based systems may need to perform an extra disk write or even an extra disk read if the page containing a record needing a version number reset has already been flushed to disk and/or evicted from memory. Thus, disk based systems might benefit from the embodiments described above that include storing a separate list of records.

Statement version numbers can be associated with both inserted records (so as to hide them from the current statement) and deleted records (so as to continue to show them to the current statement). In a system that does not permit a transaction to delete a record that was created by a different transaction that has not yet been committed, it is sufficient to use the same memory to store the version number of the statement that created the record and later the version number of the statement that deleted the record.

Embodiments may be implemented where the transaction that created the record need not have committed, but it is finished with its active processing. For example, the transaction could be in a "pre-commit" or "validating" phase. The requirement is that both statements cannot be executing concurrently. Similarly, if a statement tries to delete a record that was created by an earlier statement in the same transaction, the second statement can overwrite the version number of the first statement as long as both statements cannot be executing concurrently.

One embodiment implementation may choose to conserve version numbers by only assigning version numbers to only certain statements. This may be done, for example, to reduce the number of bytes needed to store numbers. For example, in one simple embodiment, only statements that modify data need version numbers. A more sophisticated implementation might also assign version numbers only to statements that read and write from the same table or to statements where the reads and writes could potentially conflict. For example, if a statement already contains a blocking operator (e.g., a sort) between the read and the write, there is no need to assign a new version number to the statement because a statement will not be capable of reading records that it created anyway. This optimization is especially helpful if a single bit is used to track which records were created by the current statement or if the transaction stores a list of records created by the current statement. When conservation of version numbers is performed, embodiments need to take into account whether there are output statements between the data modification statements. Anytime embodiments have an output statement, embodiments must increment the statement id on the next data modification statement.

Embodiments may be implemented where version numbers are compressed. For example, the number of bits or bytes allocated for version numbers may be based on transaction size. For example, transactions that execute fewer statements and generate relatively few version numbers could use less storage for these version numbers by tailoring the number of bits or bytes available for version numbers. For example, a transaction that executes fewer than 256 statements would need at most one byte of storage to store these version numbers.

Some embodiments may have various restrictions applied. For example, embodiments may be implemented where a statement cannot delete a record that it inserts. This can be accomplished by, as illustrated above, a design where a statement cannot read a record that it inserts and it cannot delete a record that it cannot read.

Embodiments may be implemented where a statement in one transaction cannot delete a record that was inserted by a concurrent statement in a second transaction until the concurrent statement completes and the second transaction commits. Notably, some embodiments may be implemented where the second transaction only has to begin the process of committing inasmuch as the concurrent statement must complete either way.

A single statement id per record is sufficient to track both inserted records and deleted records. If a statement is trying to read a record that was inserted by the statement, the statement will be prevented from reading the record because of the version identifier. If a statement is trying to read a record that was deleted by the statement, the statement will be allowed to read the record because of the version identifier. Thus a statement will be allowed to read inserted (and not yet deleted) records that it did not insert but will not be allowed to read inserted (and not yet deleted) records that it did insert. Also, a statement will be allowed to read deleted records that it deleted, but will not be able to read deleted records that it did not delete. Consider the following sequence of events, noting that records store three values, namely: begin transaction, end transaction, and statement id.

1. Transaction T1 begins.
2. Statement S1 in T1 begins.
3. S1 inserts record R1 (T1, -, S1).
4. S1 tries to read R1 and skips it because S1 created R1.
5. Statement S2 in T1 begins.
6. S2 reads record R1 and succeeds because S2 did not create R1.
7. S2 deletes record R1 (T1, T1, S2).
8. S2 reads record R1 and succeeds because S2 deleted R1.
9. Statement S3 in T1 begins.
10. S3 tries to read record R1 and skips it because S3 did not delete R1.

Notably, steps 4 and 8 produce the opposite result of steps 6 and 10 as a result of a stored statement identifier matching the current statement. This shows the difference between actions taken when a statement created a record and when a statement deleted a record.

Some embodiments may further include functionality for determining state of a system at a previous time. For example, using the version numbers, embodiments can determine the state of a database prior to when a particular statement operated on records, to see the state of a system as a result of a statement operating on records, etc. For example, in some embodiments, the state of the system at a particular time or after execution of a particular statement can be determined by using a version number associated with the particular time or the particular statement, and all version numbers associated with earlier times and/or earlier statements. For example, if a user wanted to observe the state of a system as a result of executing a particular statement, any record associated with a version number associated with the statement, and any record associated with version numbers associated with previously executed statements could be used to present the previous state of the system to the user.

Other systems can also benefit from the invention including SQL Server's disk based snapshot isolation implementation and other multi-version and snapshot isolation based database systems. Embodiments may be facilitated by a multi-version engine used to execute a query at any time or even multiple times and get the same result so long as the query is executed with the same timestamps, statement ids, and operand parameters. This assertion holds true even if updates have been applied to the database since the time when the query would have been executed.

Additional details regarding the two basic implementations introduced above will now be discussed. The first implementation is referred to herein as an "output plan" implementation and involves executing a transaction as one normally would except that anytime embodiments encounter a query that would return results, embodiments save the query, timestamp (e.g. the begin timestamp) and statement id, and parameters. Other statements (including those that update the database state) would be executed normally. For queries running at lower isolation levels (e.g., snapshots), the query need not be executed at all. For queries running at higher isolation levels (e.g., repeatable read or serializable), it may be necessary to execute the query and discard the results in order to gather the information necessary to later run validation (see the "Validation" phase 204) and determine whether the transaction can commit. For example, such necessary information maybe be stored in a read and/or scan set. The read set is a list of all records read by the transaction. It is used in one implementation during validation to determine whether a record that is read was later deleted or updated. This would create a read-write conflict that violates repeatable read semantics. The scan set is a list of all range lookups performed by the transaction. It may include an index to use for the lookup, start and end points for the lookup, and an arbitrary filter or predicate to apply to each record. It is used in one implementation during validation to determine whether a new record was inserted that would be visible to the transaction if it were repeated. Such a record is a phantom and violates serializable semantics. Alternatively, the system can defer executing the query and use the saved information in place of the read and scan sets. Once the transaction has passed validation and is assured of committing, the saved queries can be executed to generate the final result sets (see data 108) that must be sent to the client. Note that for queries running at a higher isolation level, the query is executed twice: once for validation purposes and again to generate the final result set.

The second realization, referred to herein sometimes as a "rerun" implementation, tries to avoid storing any data about the queries that must be reexecuted. In this example, the transaction is run twice: once to accomplish the "Modify" phase 202 and once to accomplish the "Output" phase 207. As in the first realization, during the first execution queries that return results are not executed (or are executed with the sole purpose of gathering read and scan set information). Once the transaction has passed validation, the transaction is executed again only this time, any database updates are skipped and only the queries, to generate data 108, are executed. By repeating the exact same transaction logic against the same database state, it is possible to reconstruct the queries that would have executed. Non-deterministic results from the first execution (e.g., the results of functions such as getdate( ) or newid( )) are stored, as a reexecution will give a different result than the first execution. This technique can be used not only to reconstruct the queries to produce the result sets for the client but also (by executing the transaction a total of three times) to reconstruct the queries for running validation (for queries running at repeatable read or serializable).

In a system that leverages code generation (such as OLTP's natively compiled procedures), it is possible to optimize either realization by generating customized code to execute each phase of the transaction. For example, in the first realization, the code would be split into two parts. The first part would not include any code for executing queries other than to save the required information. The second part includes code to execute the queries based on the saved information.

A single system is not limited to either implementation and can mix the two. For example, the first technique might be employed for complex transactions that use many non-deterministic functions while the second technique might be employed for simpler transactions.

The system may also have some latitude in determining when a transaction is assured of committing. For example, the system could wait only until validation has completed or it could wait for the transaction to be hardened (e.g., for a commit log record to be written to disk (see the "Log Generation" phase 208)). If the system waits only for validation to complete, there is still a possibility (albeit remote) that the transaction could fail.

Additional details are now illustrated with regard to certain exceptional circumstances that may need additional data handling or considerations.

In some systems, rather than the multi-version multiple rows illustrated in FIG. 3, a row header has a single statement id which is updated whenever a row is inserted or deleted. Generally, this functionality is useful for implementing embodiments of the invention because the same statement cannot both insert and delete the same row. However, there are a couple of scenarios where this causes problems for auto-retry transactions. As noted above, the goal of some embodiments may be to implement functionality where embodiments can rerun a statement at any time using just the timestamp and correct statement id. However, consider a first example having the following sequence of events:

a) select RowA—not found
b) insert RowA (statement id 1)
c) select RowA—found
d) delete RowA (statement id 2)
e) select RowA—not found The deletion in step d will overwrite the statement id of the row with 2. This means that a rerun of the select in step c was inserted by statement id 1 and, thus, should be visible. Moreover, it cannot merely be assumed that it is visible before statement id 2 because the row is not visible before statement id 1. Hence, embodiments may need to be configured to track the statement ids both of the statement that inserted the row and of the statement that deleted the row.

This problem is further exacerbated for nested begin atomic blocks and/or nested procedure execution (which implies nested begin atomic). Consider a second example with the following sequence of statements:

begin try
begin atomic
delete row (statement id 1)
select row—not found
throw (statement id 2)
end atomic
end try
select row—found This example illustrates how a savepoint rollback can "undelete" a row. However, recall that the row was deleted by statement id 1 and undeleted by the throw out of the atomic block (which also bumps the statement id as it has the effect of restoring the row).

There are various solutions to the issues identified above. For example, in the first example above (insert/delete in a single transaction), issues may be resolved by storing an extra statement id in the row. However, this solution requires extra data to be stored. In particular, in the examples illustrated herein, it adds 4 bytes that are rarely needed bytes to the row header.

Alternatively, the issues in the first example can also be solved by moving the insert statement id to the begin timestamp along with setting a bit flag to indicate when the timestamp is really a statement id. In this case, the real transaction id is stored in the end timestamp. (Recall that this problem only exists when the same transaction both inserted and deleted the row. Thus, the begin and end transaction ids must be the same.)

The issues identified in the first and second examples above can be jointly solved by storing extra information about statement ids in a transaction local lookup map. Embodiments can keep track of the history of all statement ids assigned to a given row pointer and use this information, to determine whether a given row was visible to a given statement id. Embodiments can use a bit flag or just a magic statement id to identify when embodiments must check the extra map. There are some exceptional cases that should be considered, however, when implementing such a solution. For example, assuming embodiments "undelete" the row, a concurrent transaction could then "redelete" the row and overwrite the statement id. The bit flag works, but if embodiments allow the concurrent transaction to delete the row again, embodiments cannot reset the bit flag since embodiments have no way to know how many concurrent transactions have set the bit flag. Alternatively, embodiments could use either a ref count instead of a bit or leave the row in a state that prevents concurrent transactions from deleting the row until the original transaction completes. Alternatively, embodiments could always check the extra map though this may negatively impact performance.

Embodiments may not be able to completely skip execution of output statements during the execution of the "Modify" phase 202 of a transaction. For example, if embodiments have a try/catch block in a procedure and if an output statement might fail and throw, embodiments must execute the output statement to determine the correct flow control for the procedure. Even if the output statement cannot throw, embodiments may need to execute it so that embodiments can ensure that no dependencies are taken when the statement is executed during the "Output" phase 207 of the transaction. Alternatively, embodiments may implement functionality that waits for dependencies to "clear" on a row-by-row basis so that no dependencies are ever taken during the "Output" phase 207 of the transaction. However, in some embodiments, this involves blocking an API used for determining whether a given row was visible to a given statement id.

Yet another alternative is to delay execution of the "Output" phase 207 for a given transaction until all other transactions on which the transaction could possibly take a dependency have committed (i.e. phase 206 in FIG. 2). The only transactions that matter here are those that are already in validation, so the delay should be fairly short. Moreover, embodiments only need to wait for the concurrent transactions to complete validation; embodiments do not need to wait for log records to be written as embodiments can simply fail auto-retry in the unlikely event of a media or other hardware failure.

Similarly, if embodiments use the "rerun" method to determine which output statements to execute, embodiments would need to rerun at least some modification statements to reconstruct flow control during the "Output" phase 207 of execution. Alternatively, embodiments could use a hybrid of "output plan" and "rerun" to keep track of which statements generated errors during the "Modify" phase 202 of execution. In particular, even though certain types of errors can be hidden from the client 102, other errors need to be reported to the client 102. Thus, even though the server 104 knows the transaction will fail, it must still be able to intentionally generate any errors that should be reported to the client.

The approach embodiments take may have a big impact on performance. For example, embodiments could wind up effectively running every output statement twice which could be expensive depending on the statements. In some cases, embodiments may be able to optimize somewhat. For example, if all output statements are clustered at the end of the procedure with no intervening modification statements, embodiments do not have to worry about flow control affecting what output statements embodiments run. However, embodiments implement functionality to avoid failures due to transaction dependencies during the "Output" phase 207 of execution.

Even if embodiments exit a procedure with an error (one that does not trigger an automatic retry or if embodiments have exhausted a predetermined automatic retry limit), embodiments must still run the "Output" phase 207 of the transaction if embodiments have any outputs that would have been generated prior to the error. Clients are permitted to assume that any output statements that would have executed prior to where the error was raised will run. The error itself will be delayed until after all appropriate output statements have been executed.

Embodiments supporting nested executions include functionality for nesting execution of auto-retry transactions. Embodiments using the "rerun" method to run the "Output" phase 207 of execution support two entry points to all procedures. The first entry point performs the "Modify" phase 202 of the transaction while the second entry point performs the "Output" phase 207 of the trans action.

In contrast, embodiments that use the "output plan" method to track each output statement track the procedure to which each output statement belongs as part of an output plan 110.

Nested execution may be limited in some embodiments. For example, optimizations implemented to skip simulated execution of output statements during the "Modify" phase 202 of execution when the output statement is at the end of the procedure can only be possible if a procedure is executed directly or as part of a nested execution where no further modification statements are executed in any of the caller scopes further up the stack.

Errors that embodiments may be configured to detect and support for auto-retry are validation failures (repeatable read or serializable), commit dependencies, and write-write conflicts. Validation failures and commit dependencies tend to self-correct on retry since the conflicting transaction must already be in validation and the retrying transaction will acquire a new begin timestamp that is greater than the conflicting transaction's end timestamp. Write-write conflicts are more problematic since they can involve two active transactions and may persist on retry if the transaction that has successfully deleted the row in question is long running. Thus, for write-write conflicts some embodiments may implement a delay for retries until the conflicting transaction completes.

Thus, in general, as noted above and with reference to FIG. 2, the steps to execute an auto-retry transaction are as follows:

(1) Get begin timestamp (See 201)
(2) Execute the modify phase (See 202)
(3) Get end timestamp (See 203)
(4) Run validation (See 204)
(5) Wait for all dependencies to clear (See 205)
(6) Wait for all validating transactions on which embodiments might take a dependency (e.g., in some embodiments, validating transactions with an end timestamp lower than the current transaction's begin timestamp; or when skipping the "Validation" phase 204 and running statements as of the end of the timestamp during the "Output" phase 207 as described below, validating transactions with an end timestamp lower than the current transaction's end timestamp; etc.) to drain (See 206)
(7) Execute the output phase (using the begin timestamp) (See 207)
(8) Generate log (if required) and commit (See 208)
(9) Perform post-processing (See 209)

If any steps between 2 and 7 fail with a commit dependency failure, a write-write conflict, or a validation failure, processing should restart from step 1 with a new begin timestamp.

For a write-write conflict, embodiments wait for the conflicting transaction to acquire an end timestamp before restarting.

Step 6 is only necessary if embodiments do not execute all output statements during the modify phase.

Generally, embodiments will run all output statement in all cases. For repeatable read or serializable isolation levels, the statements populate the read and/or scan sets to be checked during "Validation" phase 204. Any errors (excluding those that trigger a retry) are detected and trigger the appropriate control flow.

One optimization, expressed generically, is to skip any output statements that would not affect:

(a) if using the output plan method: flow control;
(b) if using the rerun method: which modification statements run.

In particular, the output plan method needs to determine during the "Modify" phase 202 which output statements should run. So any statement that affects flow control in any form even if the effect is only to change which output statement should run, is taken into account. In the rerun case, output statements that only affect which other output statements might run can be skipped during the "Modify" phase.

Note that skipped statements may still require validation

The following now illustrates specific optimizations.

Excluding resource errors (e.g., out of memory, hardware failure, etc.), it is generally possible given a query plan to determine whether a statement can possibly throw an error. If a statement cannot throw an error, it cannot alter flow control.

In the absence of a try/catch block, it does not really matter whether statements within an atomic block throw since all data modifications will be rolled back.

Slight variations and further optimizations of the above generalized rules are possible. For example, with the output plan method, embodiments generally need to know which output statements to run. While embodiments can run the output statements once during the "Modify" phase 202 to ascertain the answer, there are other solutions. For example, embodiments can note in the output plan 110 that an error should skip all remaining output statements in the output plan 110. In particular, embodiments generate a list of output statements to run during the "Output" phase 207. One or more of those statements could throw an error and, thus, terminate execution and skip over the remaining output statements. Embodiments can avoid actually running the output statements during the modify phase just to determine whether there will be an error. Thus, if there are no other modification statements left, embodiments can just add the remaining output statements into the output plan 110 with an annotation indicating that any error means that the system should stop executing any further output statements in the output plan. Alternatively or additionally, embodiments can use a hybrid approach where embodiments switch from an output plan mode to a rerun mode for output statements at the end of a procedure (that are not followed by any data modification statements).

The following illustrates additional details and/or alternatives for running validation for output statements running at repeatable read and/or serializable isolation levels. As noted above, if output statements are run during the modify phase, they can populate the read and/or scan sets. If output statements may be skipped based on the optimization above: (a) embodiments can run the statements anyhow and populate the read and/or scan sets; or (b) embodiments can run the statements during "Validation" phase 204 then: (i) embodiments can populate the read and/or scan sets as embodiments normally would in a "pre-validation" step and (ii) embodiments can run "Validation" phase 204 while executing the statement by checking each row against the transaction's begin and end timestamps at the same time. For repeatable read, each row that is visible as of the begin timestamp is also visible as of the end timestamp. For serializable embodiments, each row has the same visibility (whether visible or not visible) as of both timestamps.

As with determining what to run during the "Output" phase 207, embodiments can discover which statements to run during "Validation" phase 204 via either the output plan or rerun mechanisms.

Delaying the execution of statements until "Validation" phase 204 reduces the time elapsed between the transactions' begin and end timestamps and, thus, reduces the risk of validation failures.

For output statements that can be skipped, embodiments can skip "Validation" phase 204 as well (regardless of isolation level) and run these statements as of the end timestamp during the "Output" phase 207. This will not violate repeatable read or serializable semantics (as the end timestamp is the actual time at which the transaction is serialized), but it may violate snapshot "semantics". In particular, a transaction running the same output statement twice at repeatable read might see different results due to phantoms if the first execution ran at the begin timestamp (assuming it could not be skipped and was executed during the modify phase) and the second execution ran at the end timestamp (assuming it was skipped and was executed during the "Output" phase 207). Phantoms do not violate repeatable read semantics but the different results would violate snapshot semantics.

Using the above principles, embodiments can be implemented such that no statement ever gets executed more than twice. In particular, if a statement can be skipped during the modify phase and does not require validation (runs at snapshot), the statement can be executed once during the "Output" phase 207. If a statement can be skipped during the modify phase but does required validation (runs at repeatable read or serializable semantics), it is executed twice: once during "Validation" phase 204 and again during the "Output" phase 207. If a statement cannot be skipped during the modify phase, it is executed twice: once during the modify phase and again during the "Output" phase 207. The statement does not need to be executed during the "Validation" phase 204 since the first execution will have populated the read and/or scan sets.

In some cases, if a statement must be executed during the "Modify" phase 202 or "Validation" phase 204, it might be cheaper to save the result than to rerun it later. The decision of whether to save the result could be made at compile time or at runtime. For example, at compile time, a scalar aggregate that is known to produce a single row would be a good candidate for saving the result rather than rerunning a statement. At runtime, embodiments could save the first row and then bail if embodiments get a second row. In general, in determining whether to save a result or rerun a statement, some embodiments implement decision logic that revolves around the amount of data that would need to be saved. If the amount is provably small (e.g., the scalar aggregate example, a lookup by a primary key where embodiments know a single row will be returned, or a top N query where N is small), embodiments could make a compile time decision. Otherwise, embodiments might skip the optimization or attempt a runtime optimization saving the first row or a few rows until embodiments reached some determined size threshold. Once the size threshold is reached, embodiments can abandon the optimization.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
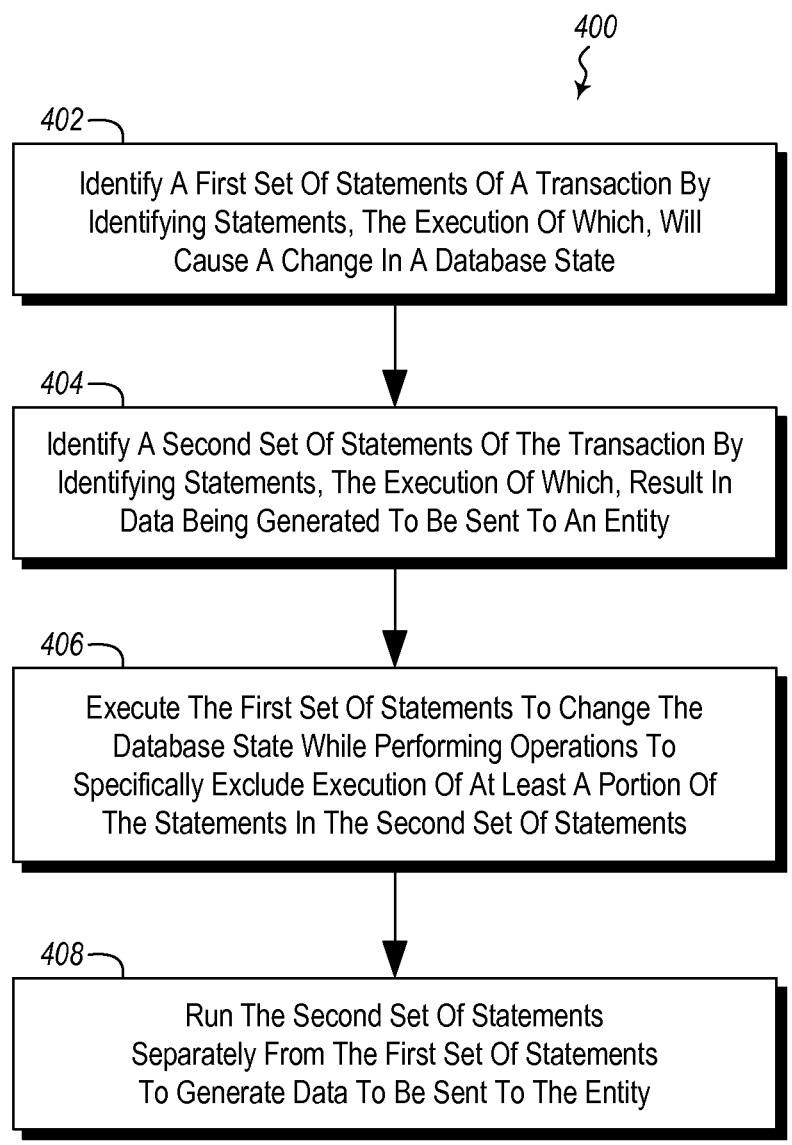
FIG. 4 illustrates a method for running transactions against a database.

Referring now to FIG. 4, a method 400 is illustrated. The method 400 may be practiced in a computing environment. The method includes acts for running a transaction against a database that allows the transaction to be automatically retried when the transaction fails such that certain transaction failures that cause the transaction to be automatically retried are not visible to an entity that receives data as a result of the execution of the transaction. The method includes identifying a first set of statements of a transaction by identifying statements, the execution of which will cause a change in the database state (act 402). These statements may be identified, for example, by identifying traditional database modify statements. Notably, the entity may be a client querying a database, middleware in a web server, etc.

The method 400 further includes identifying a second set of statements of the transaction by identifying statements, the execution of which, result in data being generated to be sent to the entity (act 404). The statements may be identified, for example, by identifying traditional database select statements.

As noted above, some traditional database statements may occasionally include functionality where execution of a given statement will cause a change in the database state and result in data being generated to be sent to the entity. In some embodiments, such statements may be subdivided into sub-statements with the sub-statements added to the different statement sets rather than the traditional database statement itself. Thus, when statements are referred to herein, it should be appreciated that such statements could actually be created from a logically divided higher level statement. Thus, for example, a statement included in the first set of statements and a statement included in the second set of statements may be logical sub-portions of a higher level statement with the higher level statement itself never being added, as a whole, to either set.

The method 400 further includes executing the first set of statements to change the database state while performing operations to specifically exclude execution of at least a portion of the statements in the second set of statements (act 406). For example, as illustrated above, the "Modify" phase 202 is performed.

The method 400 further includes running the second set of statements separately from the first set of statements to generate data to be sent to the entity (act 408). For example, as illustrated above, this may be performed as part of the "Output" phase 207.

The method 400 may be performed by in a first pass, stepping through a set of statements that includes the first set of statements and the second set of statements. When a statement from the first set of statements is identified, the statement is executed. Any statements identified as being from the second set of statements is discarded on the first pass. In a second pass, the method steps through the set of statements that includes the first set of statements and the second set of statements and when a statement from the second set of statements is identified, the method executes the statements from the second set of statements while discarding, without executing, any statements from the first set of statements. This is an example of the rerun embodiments described above.

The method 400 may be performed by in a first pass, stepping through a set of statements that includes the first set of statements and the second set of statements and when a statement from the first set of statements is identified, executing the statement, and when a statement from the second set of statements is identified, the statement is saved along with parameters needed for executing the statement from the second set of statements for later execution. Separately, the method 400 includes executing any saved statements from the second set of statements using the parameters needed for executing the statements from the second set of statements. This is illustrated above as an example of an output plan embodiment. In some such embodiments, the method may further include saving a timestamp and a statement identifier with any saved statement.

The method 400 may further include identifying a statement from the second set of statements that needs to be executed to identify one or more statements that need to be executed from the first set. As a result, the method 400 may include executing the statement from the second set of statements, but discarding the result after the database state is changed. The discarded statement can be later run to generate data to be sent to the entity.

The method 400 may further include identifying a statement from the second set of statements that needs to be executed to identify one or more statements that need to be executed from the first set. As a result, the method 400 may include executing the statement from the second set of statements. However, in this case, the result may be saved rather than discarded such that the statement does not need to be rerun to generate the result. This is especially useful for small and/or non-deterministic results. The saved result can then be sent to the entity as part of the output phase (see "Output" phase 207). Thus, for example, the method 400 may further include determining that a statement from the second set of statements, that when executed, produces a non-deterministic result. As a result of determining that the statement from the second set of statements, that when executed, produces a non-deterministic result, the method 400 may include executing the statement from the second set of statements, and saving the result. This may be done rather than rerunning the statement from the second set of statements and sending the saved result to the entity.

The method 400 may further include identifying an error that occurs as a result of executing one or more statements from the first set of statements. While some errors may be hidden form the entity, in this example, the error is an error that the entity would ordinarily be aware of. The method 400 may further include identifying statements from the second set that ordinarily would have run before the error. Thus for example, a set of statement may be sequentially ordered with some database state changing statements interspersed with database query statements to generate data for returning to a client. Thus certain query statements may be skipped when executing database state changing statements up to a database state changing statement that causes an error that the client should be aware of. The method 400 further includes running the statements from the second set of statements that would ordinarily have run before the error to produce results to be sent to the entity. For example, the skipped query statements that are in the sequential list before the error causing statement can be run. The method may further include sending the results to the entity.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method of running a transaction against a database that allows the transaction to be automatically retried when the transaction fails such that certain transaction failures that cause the transaction to be automatically retried are not visible to an entity that receives data as a result of the execution of the transaction, the method comprising:

receiving a transaction to be performed on a database, the transaction comprising a plurality of executable statements and the transaction, when completed, resulting in data being sent to the entity;

prior to running the database transaction, dividing the plurality of executable statements into at least two sets of statements by performing each of:

identifying a first set of statements of the transaction, each statement of the first set of statements identified as a statement which, when executed, will cause a change in the database state, will not cause data to be sent to the entity, and which can be automatically and transparently to the entity retried in the event of failure, and identifying a second set of statements of the transaction, each statement of the second set of statements identified as a statement which, when executed, will result in data being generated to be sent to the entity and which cannot be retried transparently with respect to the entity;

after dividing the plurality of executable statements into the first and second sets of statements, running the database transaction by executing the first and second sets of statements separately in at least two phases, including:

in a first phase, prior to executing at least some statements of the second set of statements, executing the first set of statements to change the database state, performing operations to delay execution of at least a portion of the statements in the second set of statements, and storing non-deterministic results of execution of the first set of statements; and in a second phase, subsequent to executing one or more statements of the first set of statements, executing again statements in first set of statements necessary to establish flow control and executing the at least a portion of the second set of statements separately from the first set of statements to generate data to be sent to the entity; and saving a timestamp and a statement identifier with a saved statement.

2. The method of claim 1, further comprising:

in a first pass, stepping through a set of statements that includes the first set of statements and the second set of statements and when a statement from the first set of statements is identified, executing the statement while discarding without executing any statements from the second set of statements; and in a second pass, stepping through the set of statements that includes the first set of statements and the second set of statements and when a statement from the second set of statements is identified, executing the statement while discarding without executing any statements from the first set of statements.

3. The method of claim 1, further comprising:

stepping through a set of statements that includes the first set of statements and the second set of statements and when a statement from the first set of statements is identified, executing the statement, and when a statement from the second set of statements is identified, saving the statement along with parameters needed for executing the statement from the second set of statements for later execution; and separately executing any saved statements from the second set of statements using the parameters needed for executing the statements from the second set of statements.

4. The method of claim 1, further comprising identifying a statement from the second set of statements that needs to be executed to identify one or more statements that need to be executed from the first set, and as a result, executing the statement from the second set of statements, but discarding the result after the after the one or more statements from the first set are identified, such that the statement from the second set of statements is later rerun to generate data to be sent to the entity.

5. The method of claim 1, further comprising identifying a statement from the second set of statements that needs to be executed to identify one or more statements that need to be executed from the first set, and as a result, executing the statement from the second set of statements, and saving the result and rather than rerunning the statement from the second set of statements, sending the saved result to the entity.

6. The method of claim 1, further comprising determining that a statement from the second set of statements, that when executed, produces a non-deterministic result and as a result of determining that the statement from the second set of statements, that when executed, produces a non-deterministic result, executing the statement from the second set of statements, and saving the non-deterministic result.

7. The method of claim 1, further comprising:
identifying an error that occurs as a result of executing one or more statements from the first set of statements, the error being an error that the entity would ordinarily be aware of;
identifying statements from the second set that ordinarily would have run before the error;
running the statements from the second set of statements that would ordinarily have run before the error to produce results to be sent to the entity; and
sending the results to the entity.

8. A system for running a transaction against a database that allows the transaction to be automatically retried when the transaction fails such that certain transaction failures that cause the transaction to be automatically retried are not visible to an entity that receives data as a result of the execution of the transaction, the system comprising
one or more processors; and
one or more computer readable media having stored therein computer executable instructions that, when executed by at least one of the one or more processors, cause at least one of the one or more processors to perform the following acts:
receiving a transaction to be performed on a database, the transaction comprising a plurality of executable statements and the transaction, when completed, resulting in data being sent to the entity;
prior to running the database transaction, dividing the plurality of executable statements into at least two sets of statements by performing each of:
identifying a first set of statements of the transaction, each statement of the first set of statements identified as a statement which, when executed, will cause a change in the database state, will not cause data to be sent to the entity, and which can be automatically and transparently to the entity retried in the event of failure, and
identifying a second set of statements of the transaction, each statement of the second set of statements identified as a statement which, when executed, will result in data being generated to be sent to the entity and which cannot be retried transparently with respect to the entity;
after dividing the plurality of executable statements into the first and second sets of statements, running the database transaction by executing the first and second sets of statements separately in at least two phases, including:
in a first phase, prior to executing at least some statements of the second set of statements, executing the first set of statements to change the database state, performing operations to delay execution of at least a portion of the statements in the second set of statements, and storing non-deterministic results of execution of the first set of statements; and
in a second phase, subsequent to executing one or more statements of the first set of statements, executing again statements in first set of statements necessary to establish flow control and executing the at least a portion of the second set of statements separately from the first set of statements to generate data to be sent to the entity; and
saving a timestamp and a statement identifier with a saved statement.

9. The system of claim 8, further comprising:
in a first pass, stepping through a set of statements that includes the first set of statements and the second set of statements and when a statement from the first set of statements is identified, executing the statement while discarding without executing any statements from the second set of statements; and
in a second pass, stepping through the set of statements that includes the first set of statements and the second set of statements and when a statement from the second set of statements is identified, executing the statement while discarding without executing any statements from the first set of statements.

10. The system of claim 8, further comprising:
stepping through a set of statements that includes the first set of statements and the second set of statements and when a statement from the first set of statements is identified, executing the statement, and when a statement from the second set of statements is identified, saving the statement along with parameters needed for executing the statement from the second set of statements for later execution; and
separately executing any saved statements from the second set of statements using the parameters needed for executing the statements from the second set of statements.

11. The system of claim 8, wherein the one or more computer readable media further comprises instructions for identifying a statement from the second set of statements that needs to be executed to identify one or more statements that need to be executed from the first set, and as a result, executing the statement from the second set of statements, but discarding the result after the database state is changed such that the statement from the second set of statements is later rerun to generate data to be sent to the entity.

12. The system of claim 8, wherein the one or more computer readable media further comprises instructions for identifying a statement from the second set of statements that needs to be executed to identify one or more statements that need to be executed from the first set, and as a result, executing the statement from the second set of statements, and saving the result and rather than rerunning the statement from the second set of statements, sending the saved result to the entity.

13. The system of claim 8, wherein the one or more computer readable media further comprises instructions for determining that a statement from the second set of statements, that when executed, produces a non-deterministic result and as a result of determining that the statement from the second set of statements, that when executed, produces a non-deterministic result, executing the statement from the second set of statements, and saving the non-deterministic result and rather than rerunning the statement from the second set of statements, sending the saved result to the entity.

14. The system of claim 8, wherein the one or more computer readable media further comprises instructions for:
identifying an error that occurs as a result of executing one or more statements from the first set of statements, the error being an error that the entity would ordinarily be aware of;
identifying statements from the second set that ordinarily would have run before the error;
running the statements from the second set of statements that would ordinarily have run before the error to produce results to be sent to the entity; and
sending the results to the entity.

15. One or more physical computer readable storage devices comprising computer executable instructions that when executed by one or more processors cause actions to be performed by one or more processors for running a transaction against a database that allows the transaction to be automatically retried when the transaction fails such that certain transaction failures that cause the transaction to be automatically retried are not visible to an entity that receives data as a result of the execution of the transaction, the computer executable instructions comprising instructions that when executed by one or more processors cause one or more processors to perform the following acts:

receiving a transaction to be performed on a database, the transaction comprising a plurality of executable statements and the transaction, when completed, resulting in data being sent to the entity;

prior to running the database transaction, dividing the plurality of executable statements into at least two sets of statements by performing each of:

identifying a first set of statements of the transaction, each statement of the first set of statements identified as a statement which, when executed, will cause a change in the database state, will not cause data to be sent to the entity, and which can be automatically and transparently to the entity retried in the event of failure, and identifying a second set of statements of the transaction, each statement of the second set of statements identified as a statement which, when executed, will result in data being generated to be sent to the entity and which cannot be retried transparently with respect to the entity;

after dividing the plurality of executable statements into the first and second sets of statements, running the database transaction by executing the first and second sets of statements separately in at least two phases, including:

in a first phase, prior to executing at least some statements of the second set of statements, executing the first set of statements to change the database state, performing operations to delay execution of at least a portion of the statements in the second set of statements, and storing non-deterministic results of execution of the first set of statements; and in a second phase, subsequent to executing one or more statements of the first set of statements, executing again statements in first set of statements necessary to establish flow control and executing the at least a portion of the second set of statements separately from the first set of statements to generate data to be sent to the entity; and saving a timestamp and a statement identifier with a saved statement.

16. The one or more physical computer readable storage devices of claim 15, wherein the instructions further cause the one or more processors to:

in a first pass, stepping through a set of statements that includes the first set of statements and the second set of statements and when a statement from the first set of statements is identified, executing the statement while discarding without executing any statements from the second set of statements; and in a second pass, stepping through the set of statements that includes the first set of statements and the second set of statements and when a statement from the second set of statements is identified, executing the statement while discarding without executing any statements from the first set of statements.

17. The one or more physical computer readable storage devices of claim 15, wherein the instructions further cause the one or more processors to:

stepping through a set of statements that includes the first set of statements and the second set of statements and when a statement from the first set of statements is identified, executing the statement, and when a statement from the second set of statements is identified, saving the statement along with parameters needed for executing the statement from the second set of statements for later execution; and separately executing any saved statements from the second set of statements using the parameters needed for executing the statements from the second set of statements.

18. The one or more physical computer readable storage devices of claim 15, further comprising instructions for identifying a statement from the second set of statements that needs to be executed to identify one or more statements that need to be executed from the first set, and as a result, executing the statement from the second set of statements, but discarding the result after the database state is changed such that the statement from the second set of statements is later rerun to generate data to be sent to the entity.

19. For one or more transactions performed at a database server, where each transaction is defined by a set of statements defining functions that must all succeed or all fail atomically, a computer-implemented method comprising:

performing in a database server by executing computer-executable instructions on one or more processors:

separating the execution of each transaction into two different phases;

in a first phase:

identifying a first set of statements of a transaction by identifying statements that do not require interaction with a client computing system, will not cause data to be sent to the client computing system, and that can be automatically and transparently to the client computing system retried in the event of a failure of the transaction without a client computing system being aware of the failure;

identifying a second set of statements of the transaction by identifying statements that, when executed, will result in data being generated to be sent to the client computing system and which cannot be retried transparently with respect to the client computing system;

attempting execution of the first set of statements for one or more transactions and, during attempting execution of the first set of statements, delaying execution of the second set of statements; and before executing the second set of statements, storing non-deterministic results of execution of the first set of statements;

automatically retrying any failed transaction by re-executing one or more of the statements in the first set of statements of the failed transaction without making the client computer system aware of the failed transaction; and successfully executing the first set of statements for one or more transactions, using, when required, automatic re-execution for a failed transaction, the successful execution of the first set of statements for one or more transactions changing the database state at the database server; and in a second phase:

executing again statements in first set of statements necessary to establish flow control; and for each transaction for which the first set of statements is successfully executed, separately executing the second set of statements to generate data that is sent to the client computing system, such that transactions that failed and have been retried are not visible to the client computing system receiving the generated data; and saving a timestamp and a statement identifier with a saved statement.

\* \* \* \* \*